United States Patent
Kobayashi et al.

[11] Patent Number: 6,138,354
[45] Date of Patent: Oct. 31, 2000

[54] METHOD OF MANUFACTURING A CORRUGATED PLATE BY ROLLING FOR USE AS AN INNER FIN OF A HEAT EXCHANGER

[75] Inventors: Hisashi Kobayashi; Yasuo Abe, both of Kariya; Toshihide Takeuchi, Toyota, all of Japan

[73] Assignee: DENSO Corporation, Kariya, Japan

[21] Appl. No.: 09/327,754

[22] Filed: Jun. 7, 1999

Related U.S. Application Data

[62] Division of application No. 08/977,432, Nov. 24, 1997, abandoned.

[30] Foreign Application Priority Data

Jan. 8, 1997 [JP] Japan .......................................... 9-1454

[51] Int. Cl.⁷ ............................. B23P 15/26; B21D 53/04; B21D 13/04
[52] U.S. Cl. ................................. 29/890.049; 29/890.054; 72/180; 72/379.6
[58] Field of Search .................. 72/180, 176, 379.6; 29/890.049, 890.054, 890.047, 890.046

[56] References Cited

U.S. PATENT DOCUMENTS

| | | | |
|---|---|---|---|
| 1,401,918 | 12/1921 | Neveu | 165/152 |
| 2,126,736 | 8/1938 | Coffelder | 165/152 |
| 2,843,179 | 7/1958 | Wiley | 72/180 |
| 3,566,643 | 3/1971 | Westerbarkey | 72/180 |
| 3,601,185 | 8/1971 | Rothman | 165/166 |
| 3,604,464 | 9/1971 | Pelley | 72/180 |
| 4,096,720 | 6/1978 | Anderson | 72/180 |
| 4,570,700 | 2/1986 | Ohara et al. | 165/170 |
| 4,645,000 | 2/1987 | Scarselletta | 165/152 |
| 4,745,967 | 5/1988 | Kern | 165/150 |
| 5,078,207 | 1/1992 | Asano et al. | 165/166 |
| 5,441,106 | 8/1995 | Yukitake | 165/177 |

FOREIGN PATENT DOCUMENTS

| | | |
|---|---|---|
| 0 538 849 A1 | 4/1993 | European Pat. Off. . |
| 2118517 | 12/1971 | Germany ................... 72/180 |
| 5-1893 | 1/1993 | Japan . |
| 6-74608 | 3/1994 | Japan . |
| 8-312357 | 11/1996 | Japan . |
| 1685569 | 10/1991 | U.S.S.R. ................... 72/379.6 |
| 234359 | 5/1925 | United Kingdom . |
| 718991 | 11/1954 | United Kingdom . |
| 744404 | 2/1956 | United Kingdom . |
| WO 86/05867 | 10/1986 | WIPO . |

*Primary Examiner*—Daniel C. Crane
*Attorney, Agent, or Firm*—Harness, Dickey & Pierce, PLC

[57] ABSTRACT

A metallic corrugated plate applying to a cooling inner fin of a heat exchanger, wherein a bending angle Θ of an end bent ridge portion is smaller than bending angle θ of the other bent ridge portions. Thus, in case the bending angle Θ becomes large by a resilient force after forming the bent ridge portions, preventing a bending rigidity of the end bent ridge portion in the spreading direction from being reduced is possible. Accordingly, preventing the inner fin from being warped from substantially the center ridge of the bent ridge portion is attained.

14 Claims, 4 Drawing Sheets

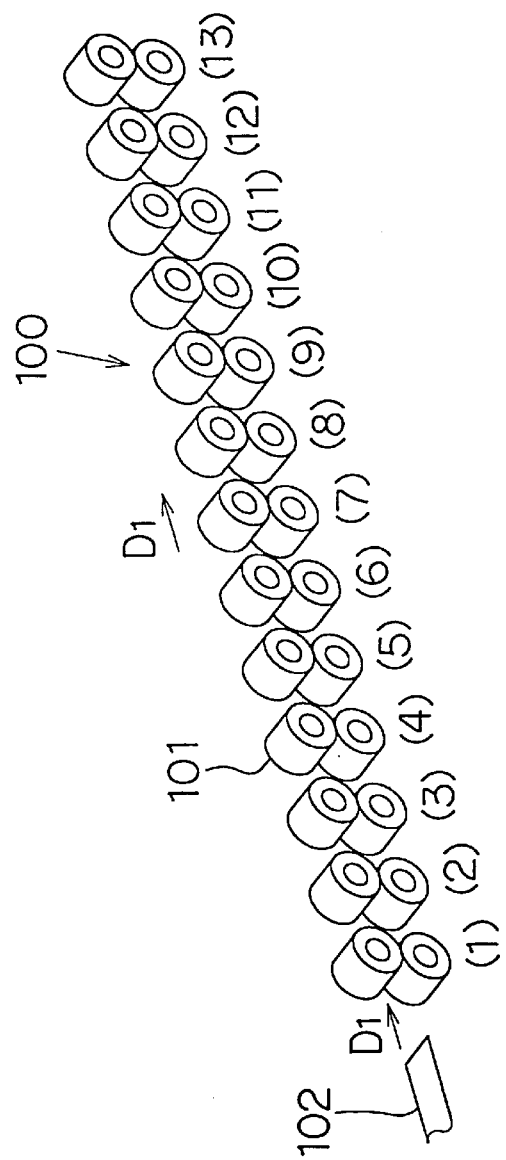
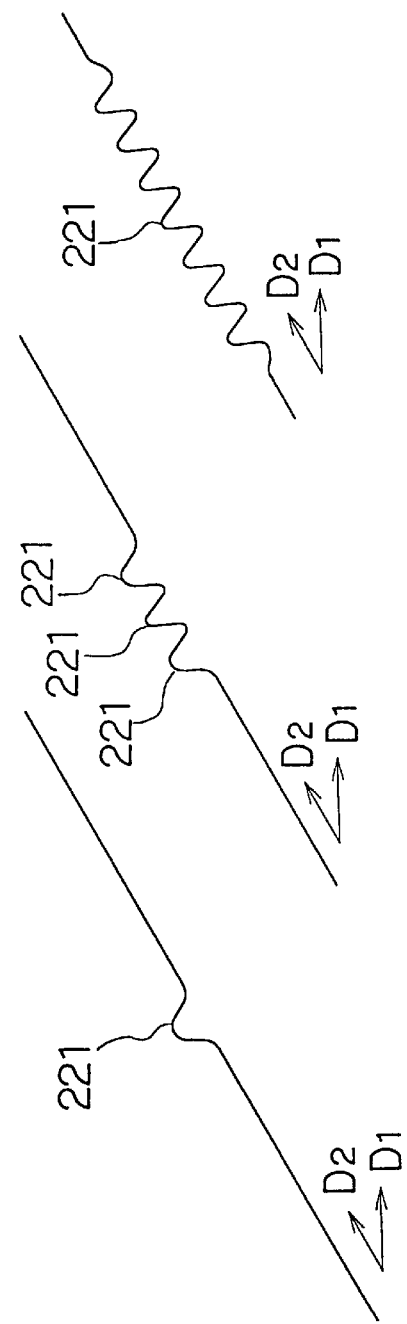

METHOD OF MANUFACTURING A CORRUGATED PLATE BY ROLLING FOR USE AS AN INNER FIN OF A HEAT EXCHANGER

CROSS REFERENCE TO RELATED APPLICATION

This is a division of U.S. patent application Ser. No. 08/977,432, filed Nov. 24, 1997, now abandoned.

This application is based upon and claims priority from Japanese Patent Application No. 9-1454 filed on Nov. 25, 1997, the contents of which are incorporated herein by reference.

BACKGROUND OF THE INVENTION

1. Field of the Invention

The present invention relates to a corrugated plate formed into corrugate shape (wave shape) which is efficiently applied to a cooling fin formed into a corrugated shape in a heat exchanger.

2. Description of Related Art

In general, to modify a heat exchanging ability of a heat exchanger, instead of changing a core width size of a heat exchanger (a size of an air flowing direction), mainly, changing a size of a direction perpendicular to the air flowing direction and the number of tubes is used.

Accordingly, as an outer fin located between the adjacent tubes is arranged in such a manner that a ridge direction of its bent ridge portion is parallel to the air flow direction, the ridge direction size of the outer fin is substantially equal to the core width size. Further, a spreading direction size of the fin is changing in accordance with a length direction size of the tube.

So, the outer fin is, in general, manufactured by feeding an aluminum thin plate, which is a fin material, into a gear type roller forming machine to obtain a corrugate shaped fin material such that the feeding direction is parallel to the spreading direction of the fin, and after that, by cutting the fin material in such a manner that its length is a predetermined value (i.e., the number of the bent ridge is to be a predetermined number).

Heat exchangers have an aluminum inner fin (whose thickness is about 0.1 mm) inside a tube of an inter-cooler or the like for improving heat exchanging ability.

This inner fin is arranged inside the tube in such a manner that a direction of a fluid flowing inside the tube (i.e., a length direction of the tube) is parallel to a bent ridge direction of the inner fin, so, the bent ridge direction of the inner fin is parallel to the length direction of the tube. Accordingly, among an inner fin outer shape size, especially, the bent ridge direction size of the inner fin fluctuates in accordance with a changing of the length direction size of the tube.

The manufacturing method in which the fin material feeding direction is parallel to the fin spreading direction cannot flexibly be applied to, e.g., forming an inner fin in which the bent ridge direction size fluctuates in accordance with the tube length direction size.

Inventors tried to form the bent ridge in such a manner that the bent ridge direction of the fin is parallel to the fin material feeding direction, and, after that, to cut the fin such that its bent ridge direction size is a predetermined value.

However, this method, as shown in FIG. 7, suffers from a difficulty in that the inner fin is warped from substantially the center of a plurality of bent ridges 221.

SUMMARY OF THE INVENTION

An object of the present invention is to prevent a corrugate shaped plate provided with a plurality of bent ridges from being warped from the bent ridge as a warp center.

The present invention adopts the following technical means for achieving the above-described object.

According to the present invention, out of a plurality of bent ridge portion, a bending angle ($\Theta$) of an end bent ridge in the spreading direction of the bent ridges is smaller than the angle ($\theta$) of the other bent ridges.

When the corrugated plate is formed in such a manner that the bent ridge direction is parallel to the fin material feeding direction as mentioned above, an expansion of the fin material occurs in the feeding direction (D1), i.e., the ridge direction (D1) of the bent ridge portion. So, after forming the bent ridges, the corrugate shaped plate is effected by remaining stress caused by this expansion.

This remaining stress has an effect on the corrugated plate to be contracted in the ridge direction (D1) responding to the expansion in the ridge direction (D1). However, since the bent ridges are formed in an expanding direction, in case these bending ridges are formed, the corrugate plate is deformable in the spreading direction, but cannot bend backward in the ridge direction easily for the bending rigidity in the spreading direction (D2) being perpendicular to the ridge direction (D1) is high.

The bent ridge portion is not formed at the outside of the end bent ridge in the spreading direction, so the bent ridges of the end side in the spreading direction are effected by a resilient force after forming, the bending angle ($\theta$) of the bent ridge portions become large.

After forming, the bending rigidity is reduced as a result of the bending angle ($\Theta$) of the end bent ridge portion becoming larger than the bending angle ($\theta$) of the other bent ridge portions; so, the corrugated plate is bent in the ridge direction (D1) by the remaining stress and it is warped from the substantial center of the ridge in the spreading direction (D2) as an entire corrugated plate.

According to the present invention, in a plurality of the bent ridge portions, since the bending angle ($\Theta$) of the end bent ridge portion is smaller than the bending angle ($\theta$) of the other bent ridge portion, it can prevent the bending rigidity of the end ridge portion in the spreading direction (D2) from being reduced excessively under a condition that the bending angle ($\Theta$) are increased by the resilient force. Accordingly, it can prevent the corrugated plate from being warped from substantially the center of the bent ridges.

Further, in the present invention, by the simple way that the bending angle ($\Theta$) is set smaller than the other bending angle ($\theta$), it can prevent the corrugated plate from being warped; therefore, without a large amount of investment for equipment, it can prevent the corrugated plate from being warped.

In addition, according to the present invention, it is preferable to set the radius of curvature (r) of the end bent ridge smaller than the radius of curvature (R) of the other bent ridge.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 5A is schematic view of a roller forming apparatus, and

FIGS. 5B–5D are schematic views of forming process of an inner fin;

DETAILED DESCRIPTION OF THE PREFERRED EMBODIMENTS

The present invention will now be described with reference to the accompany drawings.

Figure 1:
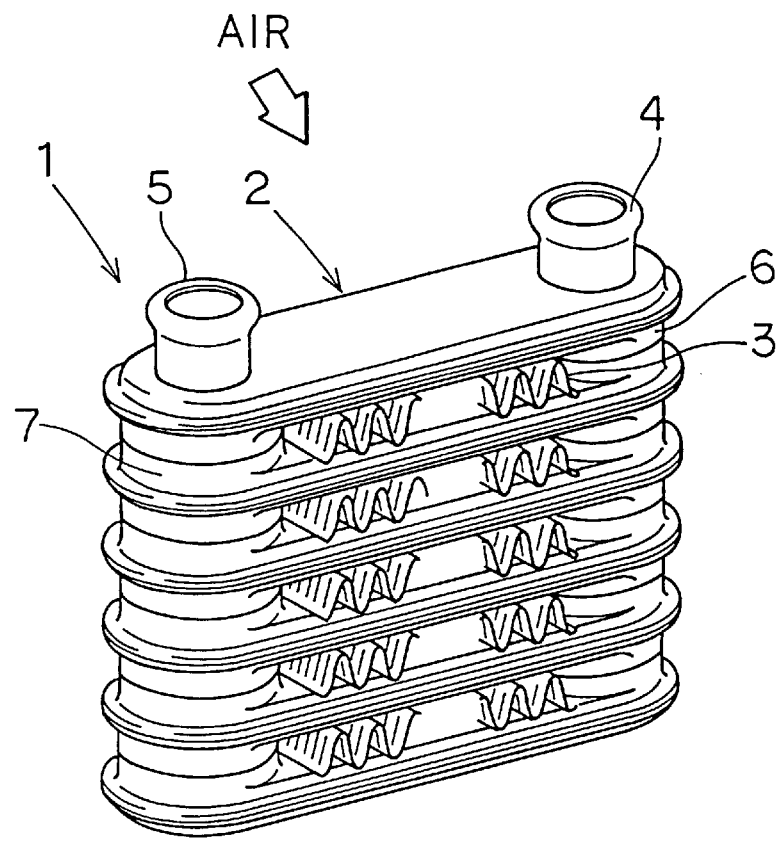
FIG. 1 is a perspective view of an inter cooler according to an embodiment of the present invention.

In the present embodiment, the corrugated plate of the present invention is applied to an inner fin of an inter-cooler, and FIG. 1 is a perspective view of the inter-cooler 1.

Figure 2:
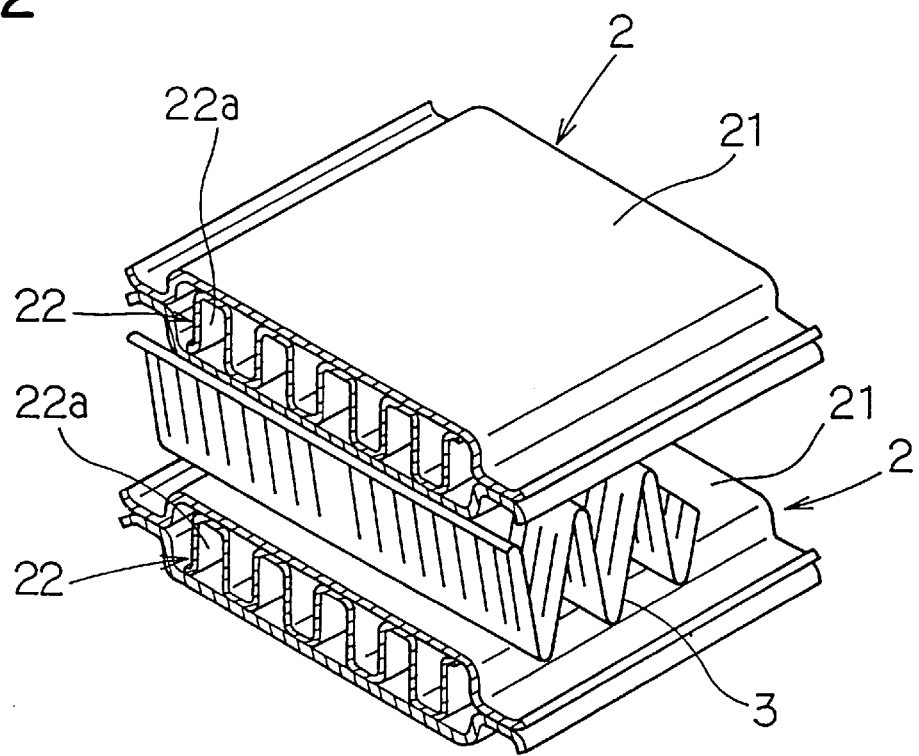
FIG. 2 is a cross-sectional view of a flat tube.
Figure 3:
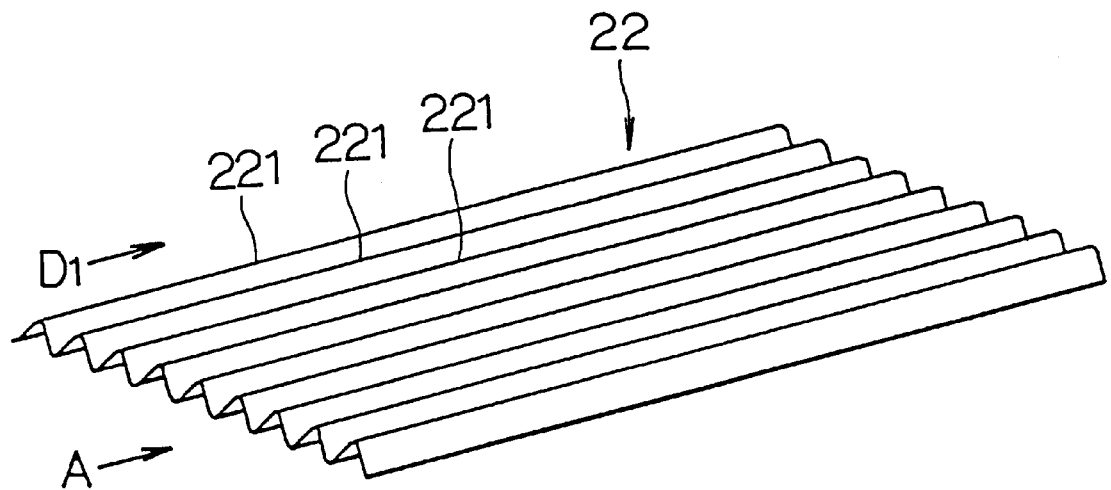
FIG. 3 is a perspective view of an inner fin.

Reference numeral 2 denotes a flat tube made of aluminum alloy (in the following, referred to as a tube) an air pressurized (in the following, named supercharged air) by a compressor (not shown) flows therein, and, as shown in FIG. 2, this tube 2 is formed by brazing a pair of plates pressed into a predetermined shape. Further, between each adjacent tubes 2, corrugate shaped (wave shaped) aluminum outer fins 3, promoting heat exchange between the supercharged air (a first fluid) and air (a second fluid) flowing in the direction substantially perpendicular to the length direction of the tube 2, are arranged. These outer fins 3 are brazed integrally with a plate 21, thereby constructing tube 2.

As shown in FIG. 2, an aluminum inner fin 22 promoting heat exchange with the super charged air is arranged inside each tube 2, and this inner fin 22 is formed into wave shape (corrugate shape) with a plurality of bent ridges 221.

Further, out of a plurality of bent ridges, a bending angle Θ of the end bent ridge portion 221 (in the following, named as an end bent ridge portion 221a) in the spreading direction of the bent ridge portion 221 is smaller than the bending angle θ of the other bent ridge portion 221. Preferably, the bending angle Θ is not more than 75% of the bending angle θ. For example, in the present embodiment, the bending angle Θ is about 26° and the bending angle θ is about 51°.

The bending angle Θ, θ are defined as an angle between each elongated line from adjacent slopes 221b (221b').

In the case of considering a tangential line L at the ridge point of the bent ridge portion 221 or the end bent ridge portion 221a, a relation between the aforesaid bending angles Θ, θ can be expressed as follows.

Out of the slope 221b forming the end bent ridge portion 221a, an angle β between the end-side slope 221b' of the entire inner fin 22 and the tangential line L is larger than an angle α between the slope 221b other than the slope 221b' and the tangential line L. Further, in the present embodiment, the angle α is about 64° and the angle β is about 90°.

In FIG. 1, reference numeral 4 denotes an inlet port into which the supercharged air is introduced, and reference numeral denotes an outlet port from which the supercharged air cooled at the inter-cooler is discharged. In addition, reference numeral 6 denotes a distributing tank which distributes the supercharged air from the inlet port 4 into the respective tubes 2, and reference numeral 7 denotes a collecting tank which collects the supercharged air passed through the respective tubes 2.

A method of manufacturing inner fin 22 will be explained.

FIG. 5A is a schematic view of a roller forming apparatus 100 which forms the bent ridge portion 221, 221a of the inner fin 22. In this roller forming apparatus 102, a plurality of rollers 101 are installed. Further, by feeding (supplying) the fin material 100 (whose thickness is about 0.1 mm) of the inner fin 22 into the roller forming apparatus 100, the bent ridge portions 221, 221a are formed in such a manner that the feeding direction D1 of the fin material 102 is parallel to the ridge direction of the bent ridge portions 221, 221a.

FIGS. 5B–5D show a process of forming the bent ridge portion 221 as the fin material feeding proceeds, where FIG. 5B corresponds to (1) of the roller 101, FIG. 5C corresponds to (5) of the roller 101, and FIG. 5D corresponds to (13) of the roller 105.

As is apparent from FIGS. 5B–5D, out of plurality of ridges of the bent ridge portion 221, the bent ridge portions 221 are formed from the bent ridge portion 221 located at the center in the direction D2 perpendicular to the feeding direction D1 (in the following, named as a spreading direction) to the end side in the spreading direction in order.

According to the inner fin 22 of the present embodiment, as mentioned above, the fin material 102 feeding direction D1 and the ridge direction of the bent ridge portions 221, 221a are the same direction. So, when the bent ridge portion 221 is formed, the fin material 102 is greatly expanded in the feeding direction D1, i.e., the ridge direction D1 of the bent ridge portion 221, 221a; thus, after forming the bending ridge portion 221, the inner fin 22 is formed by the remaining stress caused by this expansion.

This remaining stress, in accordance with the expansion in the ridge direction D1, urges the inner fin 22 to be contracted in the ridge direction D1, but, since the ridge of bent ridge portions 221 are formed in the expanding direction, the inner fin 22 doesn't bend backward easily in the spreading direction because the bending rigidity in the spreading direction D2 is high.

As described above, in addition to the fact that the bent ridge portion 221 of the inner fin 22 of the present embodiment is formed from the center in the spreading direction D2 to the end side in the spreading direction in that order, no bent ridge portion 221 is formed at the outside of the end bent ridge portion 221a. So, the bent ridge portions 221 at the end side in the spreading direction are effected by an elastic effect (a phenomena that a material would be return to its original shape after a deformation processing) comparative strongly, and the bending angle θ of the bent ridge portion 221 become large.

After the forming process, the bending angle Θ of the end bent ridge portion 221a becomes larger than the bending angle θ of the other bent ridge portion 221, and the bending rigidity is reduced. So, the inner fin 22 is bent in the ridge direction D1 caused by the remaining stress, and the inner fin 22 is entirely warped from substantially the center of the fin in the spreading direction, as described above.

Contrary to this, according to the present embodiment, out of a plurality of the bent ridge portions 221, the bending angle Θ of the end bent ridge portion 221a is smaller than the bending angle θ of the other bent ridge portions 221. Therefore, if the bending angle Θ becomes large, it can prevent the bending rigidity of the end bent ridge portion 221a in the spreading direction D2 from being reduced excessively. Thus, it can prevent the inner fin 22 from being warped from substantially the center ridge of the bent ridge portion 221 as a warp center.

Additionally, according to the inner fin 22 of the present embodiment, prevention the inner fin 22 from being warped is possible by a simple way in which the bending angle Θ is to be smaller than the other bending angles θ. So, without a large amount of investment for equipment, prevention the inner fin 22 from being warped is obtained. Thus, the cost of manufacturing the inner fin 22 can be reduced along with an improvement of the yield of the inner fin 22.

Figure 4:
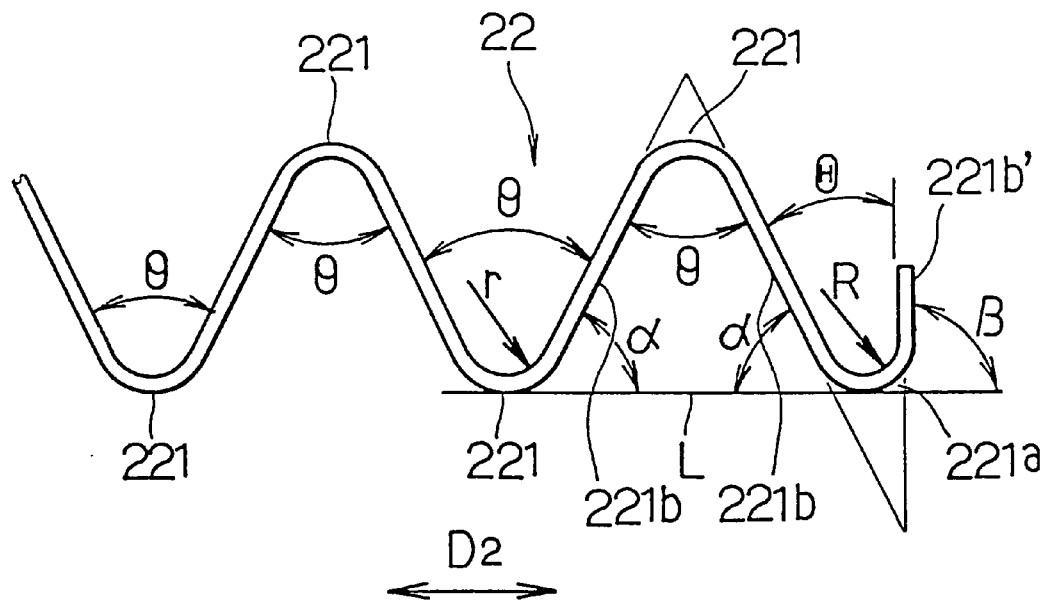
FIG. 4 is a plan view shown by an arrow A in FIG. 3.

The bending angle Θ is smaller than the other bending angle θ and the resilient force effect becomes reduced, so, as shown in FIG. 4, while the radius of curvature R of the end bent ridge portion 221a is smaller than the radius of curvature r of the other bent ridge portions 221, the degree of resilience is reduced and the warping can be prevented. For example, in the present embodiment, the radius of curvature R is 0.18–0.2 mm and the radius of curvature r is about 0.3 mm.

Figure 6A:
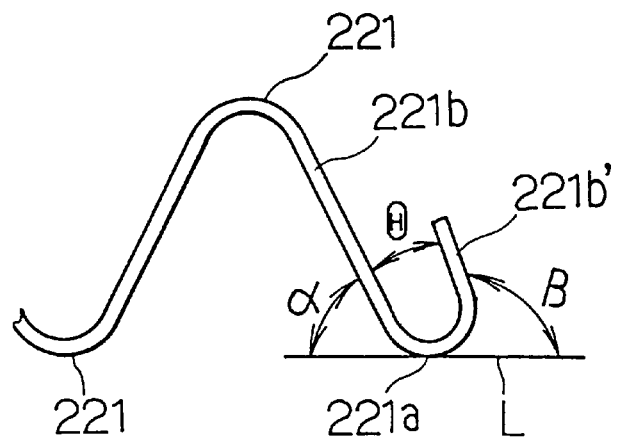
FIGS. 6A and 6B are plan views of a modified example according to the present invention shown by an arrow A in FIG. 3.
Figure 6B:
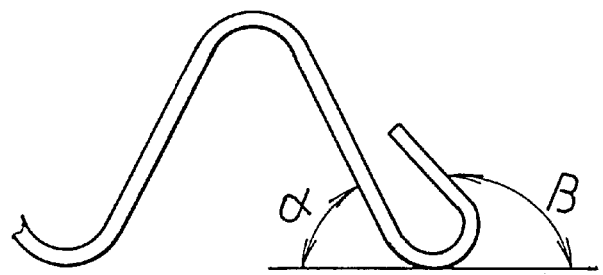
Figure 7:
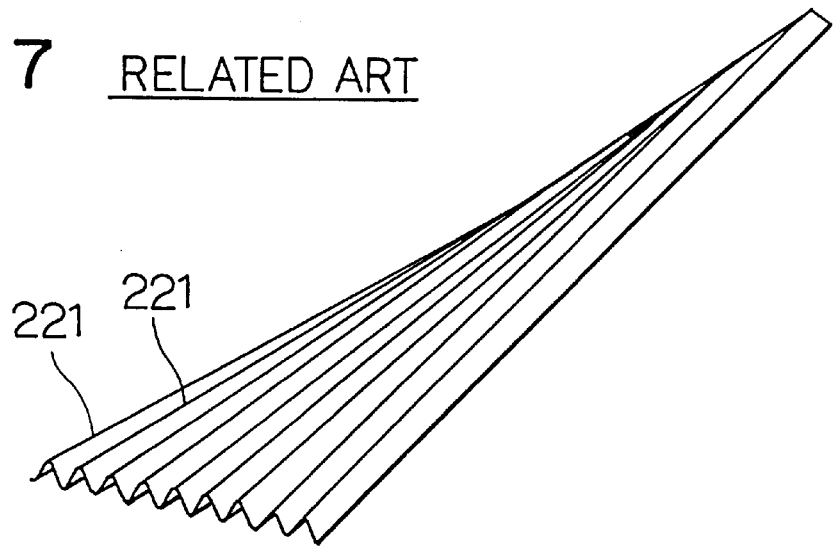
FIG. 7 is a perspective view of a condition that an inner fin is warped.

The bending angle Θ being, as shown in FIG. 6A, about 0° (β=180−α), i.e., the slopes 221b and 221b' are substantially parallel, is attainable, and as shown in FIG. 6B, each elongated line from the slopes 221b and 221b' being crossed with each other at the opposite side of the ridge point of the end bent ridge portion 221a is attainable, too.

Note, in the case of each elongated line from the slopes 221b and 221b' being crossed with each other at the opposite side of the ridge point of the end bent ridge portion 221a (in case of FIG. 6B), it can be appreciated that the bending angle Θ is smaller than 0°, therefore, in the case of each elongated line of the slopes 221b and 221b' being crossed with each other at the opposite side of the ridge point of the end bent ridge portion 221a, it can be appreciated that the bending angle Θ is negative (minus) angle. The bending angle Θ, including the negative bending angle Θ, is smaller than the other bending angle θ.

Also, in the above embodiment, the corrugated plate of the present invention was explained through, as an example, the inner fin applied to the inter-cooler, moreover, the corrugated fin of the present invention can be applied to an aluminum inner fin (where the thickness thereof is about 0.08–0.2 mm) of another heat exchanger such as a refrigerant evaporator, and so on.

What is claimed is:

1. A method for manufacturing a corrugated plate having a wave shape using a plurality of rollers, said corrugated plate being disposed within a tube in which a fluid flows for a heat exchanger, said method comprising step of:

moving a flat plate-like fin material in a moving direction to pass through said rollers; and forming a plurality of bent ridge portions from a center of said flat plate-like fin material toward both end sides of said flat plate-like fin material in order in a spreading direction of said wave shape perpendicular to the moving direction during said moving step, each of said bent ridge portions extending in a ridge direction parallel to the moving direction, and having an approximately equal height, wherein said forming step includes a step for forming a bending angle (Θ) of an end bent ridge portion in the spreading direction among said bent ridge portions, said bending angle (Θ) being smaller than any bending angle (Θ) of the other bent ridge portions and said end bent ridge portion always being an open end.

2. The method according to claim 1, wherein said bending angle (Θ) of said end bent ridge portion is not more than 75% of said bending angle (θ) of the other bent ridge portions.

3. The method according to claim 1, wherein said bending angle (Θ) of said end bent ridge portion is about 26° and said bending angle (θ) of the other bent ridge portions is about 51°.

4. The method according to claim 1, wherein:

each of said rollers includes a pair of opposite roller portions; and said fin material is moved between said opposite roller portions during said moving step.

5. The method according to claim 1, wherein said corrugated plate has a first length in the ridge direction of said bent ridge portions and a second length in the spreading direction of said wave shape, said first length being longer than said second length.

6. The method according to claim 1, wherein said plate-like fin material is made of an aluminum material and has a thickness in a range of 0.08 mm–0.2 mm.

7. A method for manufacturing a corrugated plate having a wave shape using a plurality of rollers, said corrugated plate being disposed within a tube in which a fluid flows for a heat exchanger, said method comprising step of:

moving a flat plate-like fin material in a moving direction to pass through said rollers; and forming a plurality of bent ridge portions from a center of said flat plate-like fin material toward both ends of said fin flat plate-like material in order in a spreading direction of said wave shape perpendicular to the moving direction during said moving step, each of bent ridge portion extending in a ridge direction parallel to the moving direction, and having an approximately equal height, wherein said forming step includes a step for forming a radius of curvature (R) of an end bent ridge portion in said spreading direction, said radius of curvature (R) of said end bent ridge portion being smaller than any radius of curvature (r) of the other bent ridge portions and said end bent ridge portion always being an open end.

8. The method according to claim 7, wherein said plate-like fin material is made of an aluminum material and has a thickness in a range of 0.08 mm–0.2 mm.

9. A method for manufacturing a heat exchanger including a tube in which a fluid flows therein and a corrugated fin disposed within said tube, said method comprising:

a fin forming step for forming said corrugated fin having a wave shape by using a plurality of rollers; and a brazing step for brazing said corrugated fin to said tube, wherein:

said fin forming step includes moving a flat plate-like fin material in a moving direction to pass through said rollers, forming a plurality of bent ridge portions from a center of said flat plate-like fin material toward both ends of said flat plate-like fin material in order in a spreading direction of said wave shape perpendicular to the moving direction during said moving step, each of bent ridge portion extending in a ridge direction parallel to the moving direction having an approximately equal height, and forming a bending angle (Θ) of an end bent ridge portion in the spreading direction among said bent ridge portions during said moving step, said bending angle (Θ) being smaller than any bending angle (Θ) of the other bent ridge portions and said end bent ridge portion always being an open end.

10. The method according to claim 9, wherein said plate-like fin material is made of an aluminum material and has a thickness in a range of 0.08 mm–0.2 mm.

11. A method for manufacturing a corrugated plate having a wave shape using a plurality of rollers, said method comprising:

moving a fin material in a moving direction to pass through said rollers;

forming a plurality of bent ridge portions from a center of said fin material toward both sides of said fin material in a spreading direction of said wave shape perpendicular to said moving direction, each of said bent ridge portions extending in a ridge direction parallel to said moving direction and having a ridge bending angle and a ridge height;

forming an end bent ridge portion in said spreading direction, said end bent ridge portion having an end bent ridge bending angle and an end bent ridge height; said end bent ridge bending angle being less than said ridge bending angle and said end bent ridge height being less than said ridge height.

12. The method according to claim 11 wherein said end bent ridge height is approximately one-half of said ridge height.

13. The method according to claim 11 wherein said end bent ridge height is less than one-half of said ridge height.

14. A method for manufacturing a corrugated plate having a wave shape using a plurality of rollers, said method comprising:

moving a fin material in a moving direction to pass through said rollers;

forming a plurality of bent ridge portions from a center of said fin material toward both sides of said fin material in a spreading direction of said wave shape perpendicular to said moving direction, each of said bent ridge portions extending in a ridge direction parallel to said moving direction, and having a ridge height;

forming an end bent ridge portion in said spreading direction, said end bent ridge portion having an end bent ridge height being less than said ridge height, said end bent ridge portion being formed such that an imaginary extension of said end bent ridge portion intersects one of said bent ridge portions.

* * * * *

UNITED STATES PATENT AND TRADEMARK OFFICE
CERTIFICATE OF CORRECTION

PATENT NO. : 6,138,354                                                             Page 1 of 1
DATED : October 31, 2000
INVENTOR(S) : Hisashi Kobayashi et al It is certified that error appears in the above-identified patent and that said Letters Patent is hereby corrected as shown below:

<u>Title page</u>,
Item [62], Related U.S. Application Data, "Nov. 24, 1997" should be
-- Nov. 25, 1997 --

Signed and Sealed this

Second Day of October, 2001

Attest:

*Attesting Officer*

NICHOLAS P. GODICI
*Acting Director of the United States Patent and Trademark Office*